(12) United States Patent
Onogi

(10) Patent No.: US 8,676,484 B2
(45) Date of Patent: Mar. 18, 2014

(54) CHARGE POINT REACHABILITY DETERMINATION SYSTEM

(71) Applicant: Denso Corporation, Kariya (JP)

(72) Inventor: Nobuyoshi Onogi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/788,711

(22) Filed: Mar. 7, 2013

(65) Prior Publication Data

US 2013/0238230 A1 Sep. 12, 2013

(30) Foreign Application Priority Data

Mar. 7, 2012 (JP) .................................. 2012-50835

(51) Int. Cl.
*G01C 21/26* (2006.01)
*G06F 19/00* (2011.01)

(52) U.S. Cl.
USPC .............. 701/123; 701/22; 701/408; 320/109

(58) Field of Classification Search
USPC ........... 701/123, 22, 408, 32.3; 280/735, 732; 74/492; 320/109; 705/17; 702/63
See application file for complete search history.

(56) References Cited

U.S. PATENT DOCUMENTS

| 2012/0101755 A1* | 4/2012 | Hirasawa ......................... 702/63 |
| 2013/0057209 A1* | 3/2013 | Nergaard et al. ............. 320/109 |
| 2013/0093393 A1* | 4/2013 | Shimotani et al. ............ 320/109 |

FOREIGN PATENT DOCUMENTS

| JP | 2000-46571 | 2/2000 |
| JP | 2003-262525 | 9/2003 |
| JP | 2011-252816 | 12/2011 |

OTHER PUBLICATIONS

U.S. Appl. No. 13/788,697.

* cited by examiner

*Primary Examiner* — Tan Q Nguyen
(74) *Attorney, Agent, or Firm* — Nixon & Vanderhye PC

(57) ABSTRACT

A charge point reachability determination system includes a center device and an in-vehicle device disposed in an electric vehicle. The center device includes road map information that has node information regarding a node. The node information includes a required energy of the electric vehicle for reaching a nearby charge point from the node when the node has at least one nearby charge point. The in-vehicle device generates vehicle information regarding the electric vehicle. When the electric vehicle is positioned close to the node that has the nearby charge point, the system determines, based on the node and vehicle information, the required energy for reaching the node. The system further determines whether the nearby charge point is reachable by the electric vehicle based on a comparison of the required energy determined and a remaining energy of the electric vehicle.

10 Claims, 10 Drawing Sheets

| | | | MAP INFO | VEHICLE INFO | NODE INFO |
|---|---|---|---|---|---|
| REQUIRED ENERGY | H ENERGY | ROLLIN RESISTANCE LOSS | | VEHICLE WEIGHT | TRAVEL DISTANCE TO NEARBY CHARGE P |
| | | SPEED CHANGE LOSS | | VEHICLE WEIGHT | SPEED CHANGE IN TRAVEL TO NEARBY CHARGE P |
| | | TOTAL RE-GEN ENERGY | | RE-GEN EFFICIENCY | REGENERATION INFO. |
| | V ENERGY | | HEIGHT DIFFERENCE | VEHICLE WEIGHT | |
| | SPEED-DEPENDENT ENERGY (AIR RESISTANCE LOSS) | | TRAVEL DISTANCE | PROJECTION AREA | SPEED CHANGE IN TRAVEL TO NEARBY CHARGE P |
| | TIME-DEPENDENT ENERGY (CONSUMED ELECTRIC POWER AMOUNT) | | | AIR-COND. INFO OUTSIDE TEMP. CIR/INTAKE MODE | TOTAL LINK TRAVEL TIME TO NEARBY CHARGE P |

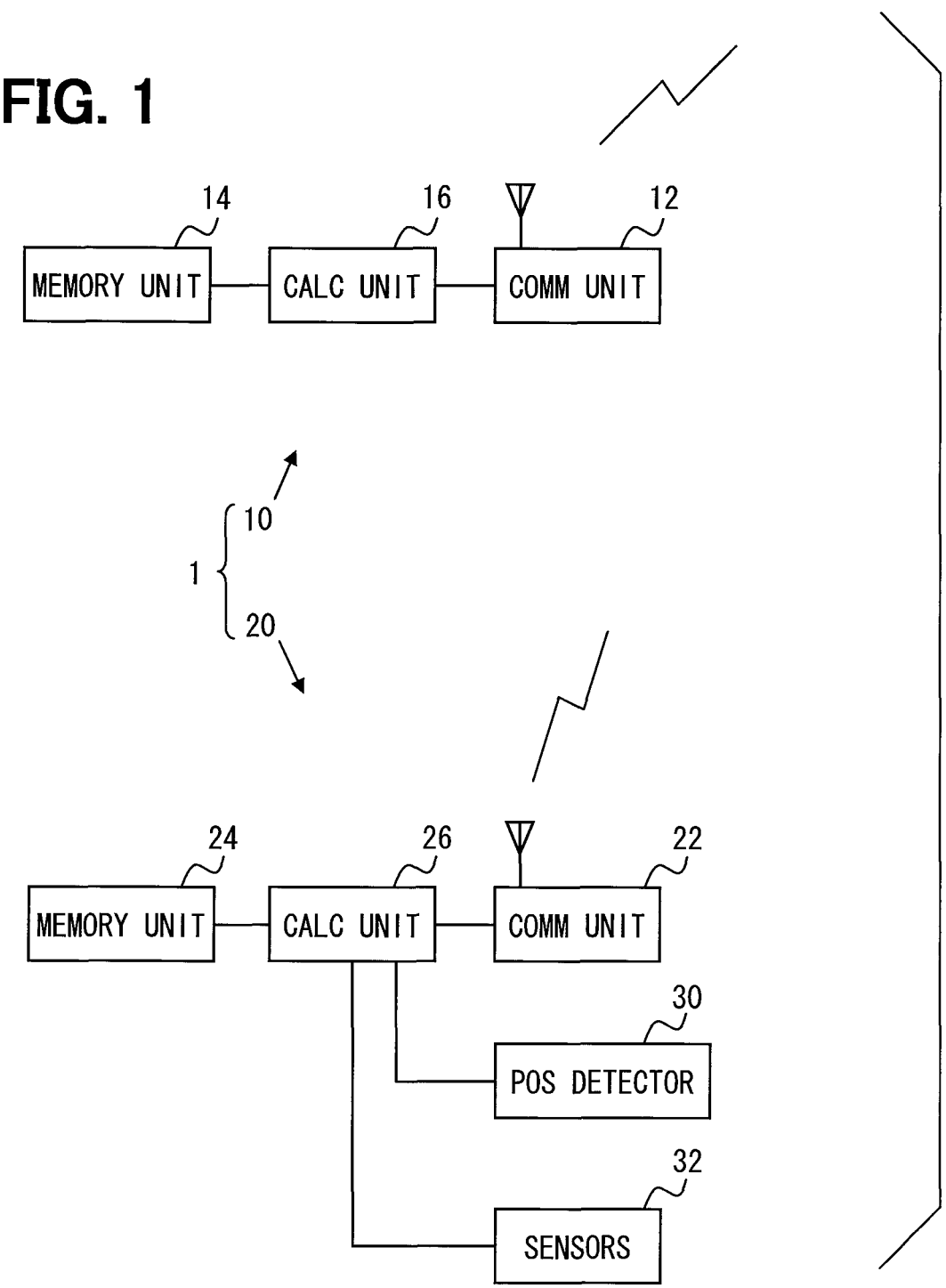

FIG. 2

| NODE | N1 | N2 | | N3 |
|---|---|---|---|---|
| NEARBY CHARGE P | P1 | P1 | P2 | P2 |
| ROUTE TO NEARBY CHARGE P | ... | ... | ... | ... |
| TRAVEL DISTANCE (KM) | 10 | 15 | 20 | 20 |
| HEIGHT DIFFERENCE (M) | 50 | 70 | 0 | 0 |
| SPEED CHANGE TO NEARBY CHARGE P | ... | ... | ... | ... |
| REGENERATION INFO. | ... | ... | ... | ... |
| TOTAL LINK TRAVEL TIME TO NEARBY CHARGE P (MIN) | 20 | 50 | 60 | 30 |
| CONGESTION OF NEARBY CHARGE P | FULL | MILD | EMPTY | MILD |

FIG. 3

| CHARGE P | P1 | P2 | P3 |
|---|---|---|---|
| POSITION (COORDINATES) | (x1, y1) | (x2, y2) | (x3, y3) |
| MAINTENANCE FACILITY | AVAIL | AVAIL | NO |
| REGULAR HOLIDAY | ... | ... | ... |
| BUSINESS HOURS | 6:00 ~22:00 | ... | ... |
| ADDITIONAL FACILITY | RESTAURANT | DRUGSTORE | NO |

FIG. 4

| VEHICLE ID | ... |
|---|---|
| VEHICLE TYPE | ... |
| REMAINING ENERGY (KWH) | 15 |
| AIR COND. INFO. | ON    SET TEMP. 27 DEG |
| OUTSIDE TEMP. (CELSIUS) | 30 |
| CIR. / INTAKE | CIRCULATION MODE |
| POSITION | ... |
| VEHICLE SPEED (KM/H) | ... |
| REGENERATION INFO. | ... |
| TRAVEL DIRECTION | ... |
| BATT. DET. INFO. | NO DETERIORATION DETECTED |
| ROUTE | NO ROUTE SETTING |
| REGISTERED CHARGE P | ... |

FIG. 8

| REQUIRED ENERGY | | MAP INFO | VEHICLE INFO | NODE INFO |
|---|---|---|---|---|
| | ROLLIN RESISTANCE LOSS | | VEHICLE WEIGHT | TRAVEL DISTANCE TO NEARBY CHARGE P |
| H ENERGY | SPEED CHANGE LOSS | | VEHICLE WEIGHT | SPEED CHANGE IN TRAVEL TO NEARBY CHARGE P |
| | TOTAL RE-GEN ENERGY | | RE-GEN EFFICIENCY | REGENERATION INFO. |
| V ENERGY | | HEIGHT DIFFERENCE | VEHICLE WEIGHT | |
| SPEED-DEPENDENT ENERGY (AIR RESISTANCE LOSS) | | TRAVEL DISTANCE | PROJECTION AREA | SPEED CHANGE IN TRAVEL TO NEARBY CHARGE P |
| TIME-DEPENDENT ENERGY (CONSUMED ELECTRIC POWER AMOUNT) | | | AIR-COND. INFO / OUTSIDE TEMP. / CIR/INTAKE MODE | TOTAL LINK TRAVEL TIME TO NEARBY CHARGE P |

FIG. 9

| | NOTIFICATION NECESSITY | | NOTIFICATION LEVEL |
|---|---|---|---|
| AFFORDABILITY | REGISTERED CHARGE POINT REACHABLE TIME | DISTANCE TO NEARBY CHARGE P | |
| LARGE | NOT-REQUIRED | NOT-REQUIRED | |
| MIDDLE | REQUIRED | NOT-REQUIRED | WITHIN 2 KM | LOW |
| SMALL | REQUIRED | REQUIRED | WITHIN 10 KM | MIDDLE |
| EXTRA-SMALL (REACHABLE WITH AIR-COND. OFF) | REQUIRED | REQUIRED | NO CONDITION | HIGH |
| NOT-REACHABLE | REQUIRED | — | NO CONDITION | HIGHEST |
| BATTERY DETERIORATED | NO CONDITION SPECIFIED | REQUIRED | NO CONDITION | SPECIAL |

| NOTIFICATION LEVEL | REACHABLE CHARGE P | POSITION (X, Y) | CONGESTION | ADDITIONAL FACILITY |
|---|---|---|---|---|
| LOW | P1 | ... | MIDDLE | DRUGSTORE |
| | P2 | ... | EMPTY | RESTAURANT |

FIG. 12

|  | PRIORITY ORDER |
|---|---|
| ON EXPECTED TRAVEL ROUTE, AND ALONG TRAVEL DIRECTION OF VEHICLE | 1 |
| ON EXPECTED TRAVEL ROUTE, AND ALONG OPPOSITE TRAVEL DIRECTION OF VEHICLE | 2 |
| IN TRAVELING DIRECTION | 3 |
| OTHER THAN ABOVE | 4 |

FIG. 13

| NODE | | N1 | N2 |
|---|---|---|---|
| NEARBY CHARGE P | | P1 | P1 P2 |
| VEHICLE TYPE | | ... | ... ... |
| REQUIRED ENERGY | AIR-COND. OFF | ... | ... ... |
| | AIR-COND. ON SET TEMP. 26 | ... | ... ... |
| | SET TEMP. 27 | ... | ... ... |
| | SET TEMP. 28 | ... | ... ... |

CHARGE POINT REACHABILITY DETERMINATION SYSTEM

CROSS-REFERENCE TO RELATED APPLICATION

This application is based on and claims the benefit of priority of Japanese Patent Application No. 2012-50835 filed on Mar. 7, 2012, the disclosure of which is incorporated herein by reference.

TECHNICAL FIELD

The present disclosure generally relates to a charge point reachability determination system that determines whether an electric vehicle can reach a charge point in an accurate manner.

BACKGROUND

Conventionally, an electric vehicle charges its battery, which is used as a power source for driving the vehicle, at a charge station (i.e., a charge point). Japanese Patent Laid-Open No. 2003-262525 (JP '525) and Japanese Patent Laid-Open No. 2011-252816 (JP '816) disclose a technique to provide information of charge stations around a current position of the vehicle.

Further, Japanese Patent Laid-Open No. 2000-46571 (JP '571) discloses a technique that calculates a travel distance of the vehicle based upon the remaining energy of the battery (i.e., a currently-reserved energy). Based on the travel distance calculated, JP '571 notifies the user (e.g., driver) of the need to charge the battery at a nearest energy supply facility (i.e., nearest charge station) when the travel distance calculated is shorter than a distance to a second nearest energy supply facility.

The technique disclosed in JP '571 determines a reachability of an energy supply facility based on a calculation of a travelable distance according to a remaining energy of the electric vehicle, and a comparison between the travelable distance calculated and a distance to the energy supply facility.

However, when accurately determining reachability of the energy supply facility, it is necessary to search for a route to the energy supply facility in consideration of an ever-changing traffic situation that may be caused by, for example traffic congestion, and to calculate a required energy for traveling the searched route.

Further, for example, multiple candidates of the energy supply facility may be presented by a navigation system to the user of the vehicle. Therefore, the required energy to reach the facilities may have to be respectively calculated in addition to a route search for each of those facilities.

Furthermore, the travel of the vehicle results in a position change of the vehicle, thereby causing continuous change of the route from the vehicle to the energy supply facility and causing calculations and re-calculations of the required energy of such ever-changing route to the facility. If the ever-changing traffic situation, such as the congestion condition, is reflected in the calculations of the required energy, an in-vehicle computer may become over-loaded by such calculations.

Therefore, such calculations may be processed by a center computer having a higher processing capacity. However, even in such a situation, the center computer may also be over-loaded by such calculations if many vehicles request the center computer to provide such calculations with the same calculation level (e.g., quality) as the one performed in each of the vehicles.

SUMMARY

In an aspect of the present disclosure, a charge point reachability determination system determines the ability of an electric vehicle to reach a charge point. The system includes a center device and an in-vehicle device disposed in an electric vehicle.

The center device includes a communication unit, which exchanges information with the in-vehicle device, a memory unit that stores road information, an energy determination unit, and a determination unit.

The road map information, which is stored in the memory unit, represents a road by using a link and a node. The road map information includes, as node information for a node that is close to a nearby charge point, a required energy that provides the amount of energy the electric vehicle needs to reach the nearby charge point from the node.

The energy determination unit determines the required energy and the determination unit determines whether the electric vehicle can reach the nearby charge point.

The in-vehicle device includes a communication unit that exchanges information with the center device, an in-vehicle obtainment determination unit, and an information transmission unit.

The in-vehicle obtainment determination unit obtains vehicle information regarding the electric vehicle, and the information transmission unit transmits the vehicle information to the center device via the communication unit.

The energy determination unit determines the required energy based on the node information and the vehicle information of the electric vehicle when the electric vehicle is positioned in proximity to the node that has the node information.

The determination unit determines whether the electric vehicle can reach the nearby charge point based on a comparison between the required energy determined by the energy determination unit and a remaining energy of the electric vehicle, which is an amount of energy that is available for driving the electric vehicle.

In the present disclosure, a node, in the road map information, having a nearby charge point in the road map information has the node information that is used to determine the required energy for the travel of the electric vehicle from such node to the nearby charge point. Further, in a situation in which the electric vehicle is positioned close to such node having the node information, the required energy is determined by using the node information and the vehicle information.

Both of the node and the nearby charge point are a fixed point. Thus, the above calculation scheme reduces a calculation load, in comparison to a case in which an ever-changing travel route from a position of the subject vehicle to a nearby charge point is continuously calculated every time the position of the subject vehicle changes, for the purpose of calculating the required energy to travel such route to reach the nearby charge point. Accordingly, the charge point reachability determination system accurately determines reachability of a charge point by the electric vehicle with a reduced process load.

In addition, the system may be configured such that the energy determination unit and the determination unit are provided in the in-vehicle device, and the information transmission unit is provided in the center device. In particular, the information transmission unit transmits the node information from the center device to the in-vehicle device via the communications units. Accordingly, as provided above, the energy determination unit determines the required energy and the determination unit determines whether the electric vehicle is able to reach to the charge point.

BRIEF DESCRIPTION OF THE DRAWINGS

Other objects, features and advantages of the present disclosure will become more apparent from the following detailed description disposed with reference to the accompanying drawings, in which:

FIG. 1 is a block diagram of a charge point notification system having an in-vehicle device and a center device;

FIG. 2 is a diagram of node information used for calculating a required energy;

FIG. 3 is a diagram of charge point information;

FIG. 4 is a diagram of vehicle information;

FIG. 8 is a diagram of information used in the calculation of the required energy;

FIG. 9 is an illustration of a notification determination made during the determination process of FIG. 7;

FIG. 12 is a diagram of priority levels for charge points when multiple charge point are available; and FIG. 13 is a diagram of the node information in a second embodiment of the present disclosure.

DETAILED DESCRIPTION

Figure 5:
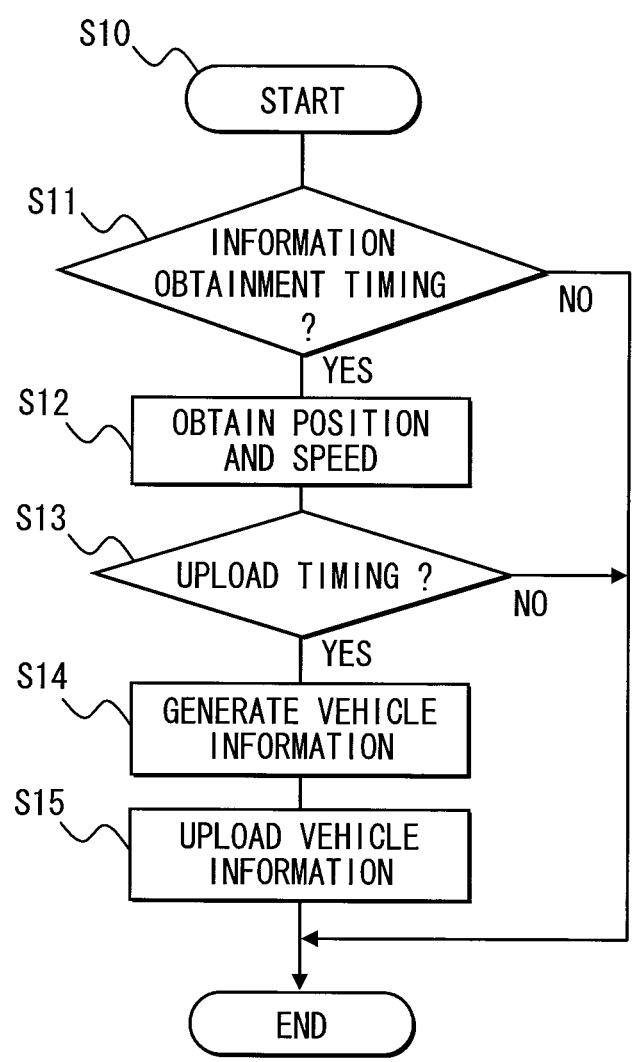
FIG. 5 is a flowchart of a vehicle information generation and transmission process performed by a calculation unit of the in-vehicle device.

Embodiments of the present disclosure are described with reference to drawings. In FIG. 1, a charge point reachability determination system 1 is illustrated and includes a center device 10 and an in-vehicle device 20.

The center device 10 includes a communication unit 12, a memory unit 14, and a calculation unit 16. The communication unit 12 performs wireless communication with a communication unit 22 of the in-vehicle device 20.

The memory unit 14 stores road map information. The road map information represents a road by using a node and a link. A node basically defines an intersection point of two or more roads, such as a crossroad, a branch point, and a merge point. However, a node may, for example, also define a point between two intersections. A link is a line which connects two adjacent nodes by extending from one node to the other along, for example, a road traffic direction. The road map information includes link information and node information for each of the links and the nodes.

The link information includes a link ID, which is a unique number, to identify a link, a link length indicating the length of a link, a link shape information, node coordinates (i.e., a latitude and a longitude) of a start point and an end point of a link, a road name, a road type, a road width, the number of lanes, and a speed limit.

The node information includes a node ID unique to each node, node coordinates, a node name, a connecting link ID of a link that is connected to a subject node, and an intersection type. Further, in the present embodiment, the node information includes information that is required for the calculation of a required energy that is required for reaching a nearby charge point from the subject node.

With reference to FIG. 2, the parameters of the node information that are used for calculating the required energy are shown. In the following, the node information simply refers to the parameters required for the calculation of the required energy.

A " . . . " mark appearing in the figures indicates that information is available for such parameter e.g., a route to the nearby charge point (FIG. 2).

The node information includes: (i) a nearby charge point (i.e., Nearby charge P), (ii) a route to the nearby charge point, (iii) a travel distance (km) along such route to the nearby charge point, (iv) a height difference (m) between the nearby charge point and the subject node, (v) a speed change observed in a travel to the nearby charge point, (vi) regeneration information about a travel to the nearby charge point, (vii) a total link travel time (min) to the nearby charge point, and (viii) congestion information of the nearby charge point.

The nearby charge point is a charge point located around the subject node. If there is no charge point around the subject node, the parameters used for the required energy calculation is not included in the node information. The charge point(s) that are considered as the nearby charge point are predetermined. Further, two or more nearby charge points may be associated with the same subject node, such as node N2 in FIG. 2 that has a Nearby charge P1 and P2.

The route to the nearby charge point is searched for by using a well-known route calculation algorithm that uses a cost associated with a link, which may define, for example, a consumed amount of energy for the travel of a link as a cost of the link.

A node around a charge point is required to have the node information, and a node far from a charge point is not required to have the node information. Based on such configuration, a route search is performed for searching for a route in which a charge point is used as a start point of the route. That is, a route search by using a Dijkstra method may be performed from one charge point to a node around the charge point until a search end condition, which may be a preset route distance of a searched route, is fulfilled. In such manner, repeated route search calculations from many nodes toward the same charge point that is commonly considered as the nearby charge point by the many nodes are eliminated.

Further, the cost used in the Dijkstra method may be, for example, an energy consumption amount, a link travel time, a link distance as well as other quantities regarding each link. In the present embodiment, a search end condition is defined as a preset value for the link travel time and the link distance, which serves as a threshold for stopping the route search calculation, that is, no farther route search calculation will be performed by using the Dijkstra method once a searched route from the calculation comes to have a threshold link travel time or a threshold link distance. Further, in the event that two or more links have the same energy consumption amount, a link having a shorter link travel time is selected by configuration.

The travel distance is a total distance along a route to the nearby charge point from the node. The height difference is measured as a difference of elevations from a sea level at two positions, i.e., at the position of the subject node and at the position of the nearby charge point.

The speed change during travel to the nearby charge point is a speed measured at multiple positions during travel of the vehicle along a route from the subject node to the nearby charge point. The speed may be calculated as, for example, an average of speeds, which are respectively measured by many vehicles actually-traveling on the route and are obtained from the vehicles as speed information. Further, the position for the measurement of such speed on the route may be positions located at predetermined intervals. The speed information is, in such case, included in vehicle information that is uploaded from each vehicle to the center device 10.

The regeneration information is information for the determination of a regeneration energy regenerated and collected during a travel of the route from the subject node to the nearby charge point. More practically, the regeneration information includes information regarding a section of the route in which a brake of the vehicle is operated and applied (i.e., a braking section). The regeneration information may preferably include step force information about a stepping force for stepping/pressing a brake pedal, in addition to the information regarding the braking section. The regeneration information is obtained through wireless communication from the vehicles actually traveling each of the links on the route.

The total link travel time to the nearby charge point is a summation of a required travel time of each of the links on the route. The required travel time of each of the links is calculated based on the travel time of many vehicles actually traveling such link. That is, for example, the total link travel time may be made up from many link travel times, which are respectively calculated as an average of many vehicle's travel time of each link.

The congestion of the nearby charge point is obtained as information from a vehicle detector for the charge point. For example, the congestion may be categorized into three classes, such as "Full," "Middle," and "Empty" according to the number of vehicles waiting for charging at a certain charge point. The congestion of the charge point may be determined as prediction of a congestion condition for each of time slot (e.g., morning hours, afternoon hours, evening hours) based on the usage statistics of the charge point in the past.

The memory unit 14 may be configured to be entirely rewritable, or may be configured to be partially rewritable, which is enabled by having many memory units included therein. Further, the node information may be stored in a rewritable portion of the memory unit 14, and may be updated at a predetermined interval, such as every five minutes.

With reference to FIG. 3, charge point information is also stored in the memory unit 14. The charge point information includes: (i) a position (i.e., coordinates) of the charge point, (ii) maintenance facility availability, (iii) regular holiday, (iv) business hours, and (v) an additional facility. The maintenance facility indicates a facility for performing a preventive maintenance and inspection of the battery, which is used as the driving power source of the vehicle. The position of the charge point is distinguishing, in terms of on which side of traffic the charge point is facing (i.e., located), especially in a case where the street having the charge point has a two-way traffic, which is at least two lanes with two opposite traveling directions.

The calculation unit 16 updates the node information based on the vehicle information received by the communication unit 12 from many vehicles.

Further, the calculation unit 16 calculates the required energy for a vehicle that has transmitted the vehicle information, based on the node information and the vehicle information transmitted. Further, the calculation unit 16 determines whether the vehicle can reach a charge point by comparing the remaining energy of the vehicle included in the vehicle information with the required energy.

The configuration of the in-vehicle device 20 is now described. The in-vehicle device 20 is installed in many electric vehicles (i.e., vehicle, hereinafter). The in-vehicle device 20 includes the communication unit 22, a memory unit 24, and a calculation unit 26. The components are connected through a vehicle LAN to a position detector 30 and various sensors 32 provided in the vehicle.

The communication unit 22 is a device that performs wireless communication with the communication unit 12 of the center device 10. The memory unit 24 temporarily stores the vehicle information. The calculation unit 26 is a computer having a CPU, a ROM, a RAM, and performs a vehicle information generation process and a vehicle information transmission process.

The position detector 30 continuously detects a current position of the position detector 30 itself. The detected position is used as the current position of the vehicle. The various sensors 32 include a temperature sensor for detecting a temperature of an outside air and a battery temperature sensor for detecting a temperature of the battery that is used for driving the vehicle.

The calculation unit 26 continuously obtains the current position from the position detector 30, and the outside temperature and the battery temperature from the sensors 32. Further, the calculation unit 26 is capable of obtaining a signal from a battery ECU (not illustrated), which indicates a battery deterioration state. Such signal indicative of the battery deterioration state may be, for example, a signal of low temperature regarding the battery serving as the driving power source of the vehicle or a signal of battery protection-maintenance requirement.

The vehicle information transmitted from the in-vehicle device 20 is described in the following. The vehicle information includes (i) information that is required for an update of the node information described above, (ii) information that is required for the calculation of the required energy, and (iii) information regarding the remaining energy.

With reference to FIG. 4, the vehicle information includes: a vehicle ID, a vehicle type, a remaining energy (kWh), air-conditioner information, outside temperature (° C.), a vehicle position, a travel direction, a vehicle speed (km/h), regeneration information, battery deterioration information, a route, and a registered charge point.

The vehicle ID is unique to each vehicle, and is stored in a predetermined storage medium, such as the memory unit 24. The vehicle type is also stored in a predetermined storage medium.

The remaining energy is a residual amount of energy remaining in the battery that supplies electric power for a motor of the vehicle, which is used to drive the electric vehicle. The remaining energy, or the amount of the remaining energy, is continuously determined, i.e., calculated, by a various kinds of well-known methods. For example, the remaining energy may be calculated by (i) accumulating the amount of charge and discharge to-from the battery and (ii) subtracting the accumulated amount from the rating amount of the battery. The remaining energy may be calculated by the calculation unit 26 of the in-vehicle device 20, or may be calculated by the battery ECU and then transmitted to the calculation unit 26.

The air-conditioner information is information indicative of whether the air conditioner is ON or OFF, and information of set temperature if it is turned ON. The circulation-intake mode information indicates an operation mode of the air conditioner, which is switched between a circulation mode that circulates an in-vehicle air and an intake mode that takes air from outside of the vehicle and inputs it in the vehicle compartment.

The position information and the vehicle speed information respectively represent a position of the vehicle and a speed of the vehicle associated with a certain period of time between the previous upload of the vehicle information and the current upload of the vehicle information. More practically, the position information is information including a time of measurement of the information and a position of the vehicle measured at such time, and the vehicle speed information is information including a time of measurement of the information and a vehicle speed at such time. Further, the position is represented by using a latitude and a longitude.

The regeneration information is information representing a section in which the brake was operated. Further, the regeneration information may preferably include the step force information about a stepping force for stepping/pressing a brake pedal.

The travel direction is information regarding in which direction the vehicle, which is transmitting the vehicle information, is traveling on a road. The battery deterioration information is obtained, as described above, from the battery ECU. The battery deterioration information may be configured to indicate whether the battery is in a deteriorated stated. For example, the battery is determined to be in a deteriorated state when a battery temperature falls to be equal to or below a certain threshold temperature value.

The route is obtained from a navigation device. An ECU in the navigation device may be used as the calculation unit 26 of the in-vehicle device 20, and, in such case, the calculation unit 26 may include, in the vehicle information, a route calculated by it. Further, as shown in FIG. 4, there may be a case in which no route is set.

The registered charge point is a charge point registered as a frequently-visited charge point where the vehicle has frequently visited. Such registration of the charge point is performed by the user. However, such registration may also be performed automatically based on a frequency of use of the charge point. The user's home may be, for example, a registered charge point. The office may also be a registered charge point, if, for example, the vehicle is a company vehicle. Further, a frequently-visited charge station may also be registered as a registered charge point.

With reference to FIG. 5, the calculation unit 26 performs, during a start-up time of the vehicle, a vehicle information generation-transmission process at predetermined intervals. At S11, the calculation unit 26 determines whether it is time to obtain information (i.e., an information obtainment timing). For instance, when a predetermined information obtainment period has lapsed from a previous obtainment of information, the calculation unit 26 determines that the information obtainment timing has arrived. Further, two or more information obtainment periods may be included in one upload period, which will be described in more details later.

When it is determined that the information obtainment timing has arrived (S11:YES), the calculation unit 26 obtains a current position and a vehicle speed, and stores them in the memory unit 24 temporarily with an obtainment time, at S12. When it is determined that such timing has not yet arrived (S11: NO), the calculation unit 26 concludes the process.

After obtaining the information in S12, the calculation unit 26 determines whether it is time to upload vehicle information (i.e., an upload timing) at S13. More practically, when an upload period has lapsed from a previous upload of the vehicle information, the calculation unit 26 determines that the upload timing has arrived. The upload period may be set to have a period of time (i) that will not slow communication traffic with too much communication load and (ii) that will sufficiently be frequent enough for the node information to be kept un-lagged from reality in the center device 10. For example, the upload period may be set as a period of 5 minutes.

When it is not time to upload the vehicle information (S13:NO), the calculation unit 26 concludes the process. When it is time to upload the vehicle information (S13:YES), the calculation unit 26, at S14, obtains various kinds of information exemplified in FIG. 4 from various kinds of devices in the vehicle, and generates the vehicle information. Subsequently, the calculation unit 26, at S15, transmits, i.e., uploads, the vehicle information generated at S14 from the communication unit 22 to the center device 10.

Figure 6:
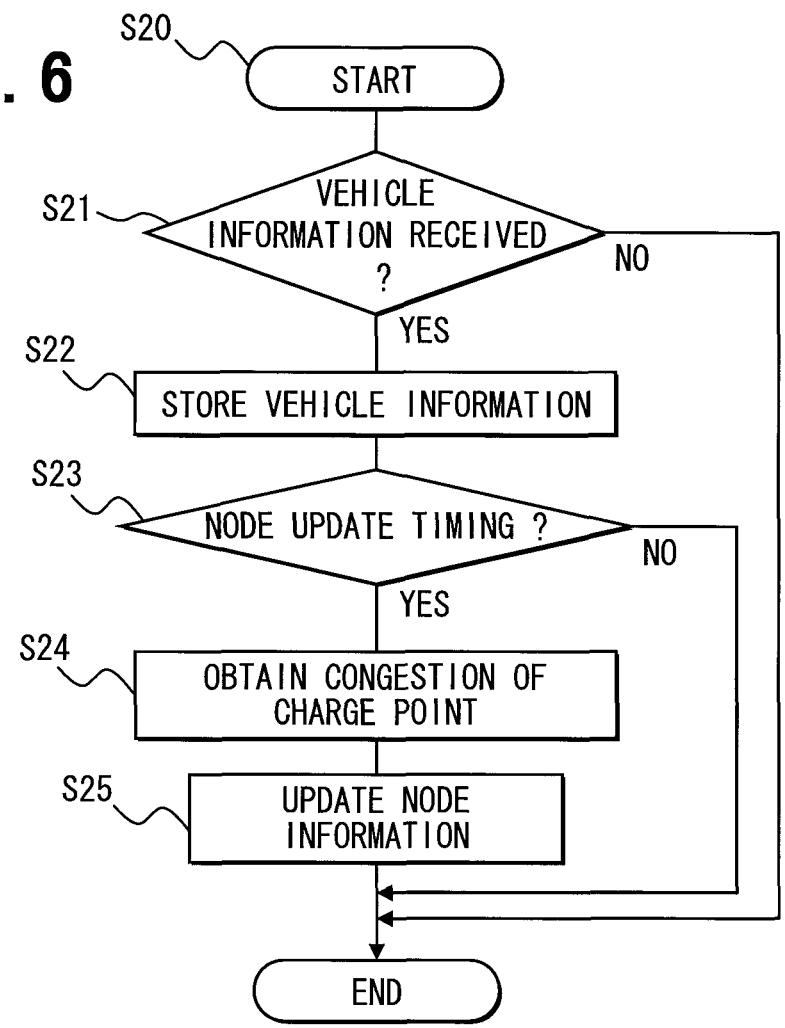
FIG. 6 is a flowchart of a node information update process performed by a calculation unit of the center device.

With reference to FIG. 6, the calculation unit 16 of the center device performs a node information update process. The calculation unit 16 repeats the process of FIG. 6 at predetermined intervals.

At S21, the calculation unit 16 determines whether the communication unit 12 has received the vehicle information. When vehicle information has not been received (S21:NO), the calculation unit 16 concludes the process of FIG. 6. When vehicle information has been received (S21:YES), the calculation unit 16 stores the vehicle information received in the memory unit 12 at S22.

The calculation unit 16, at S23, determines whether it is time to update the node information (i.e., a node update timing). The interval between the node update timings may be set to a period of time (i) that will not slow a communication traffic with too much load and (ii) that will sufficiently be frequent enough for the node information to be kept un-lagged from reality. For example a node information update period may be set as a period of 5 minutes.

When it is not the node update timing (S23:NO), the calculation unit 16 concludes the process. On the other hand, when it is the node update timing (S23:YES), the calculation unit 16 obtains information about the congestion of each charge point at S24. Subsequently, the calculation unit 16 performs the update of the node information at S25. The parameters updated in the node information include: (i) a speed change of a travel to the nearby charge point, (ii) a regeneration information in a travel to the nearby charge point, (iii) a total link travel time (min) to the nearby charge point, and (iv) a congestion information of the nearby charge point. In case a route leading to a nearby charge point is being searched for based on the link travel time, a route search may be re-performed.

The speed change during travel to the nearby charge point is determined by (i) dividing a route into links, (ii) receiving vehicle information that includes the vehicle speed information from each of the vehicles that have traveled at least one link among the links along the route, during a time between the previous and current update timings, and (iii) statistically processing the vehicle speed information received. The statistical processing of the information may be, for example, an average of the speeds of those vehicles.

The regeneration information is updated for each of the routes based on the links of the route, by storing a regeneration braking section in which at least a predetermined ratio of vehicles apply brakes. If the braking force (i.e., a stepping force for stepping a brake pedal) is included in the regeneration information, the braking forces from many vehicles in the regeneration braking sections may also be statistically processed (e.g., averaged) and updated.

When the total link travel time of the route to the nearby charge point is updated, a link travel time is calculated for the vehicle information received. Specifically, based on the position information of the vehicle information from many vehicles, which has been received during the previous and current update timings, a link travel time of each link on the route to the nearby charge point is calculated separately for each of the vehicle information (i.e., separately for all of vehicle information received). Subsequently, by statistically processing the link travel time of each link (e.g., by averaging), the link travel time of each link is updated. The link travel time of each link is added along the route to calculate and update a total travel time of the route to the nearby charge point.

Further, in case a route to a nearby charge point is being searched for based on the link travel time, a route search itself may be re-performed. The congestion information of the nearby charge point is updated based on the result obtained at S24.

Figure 7:
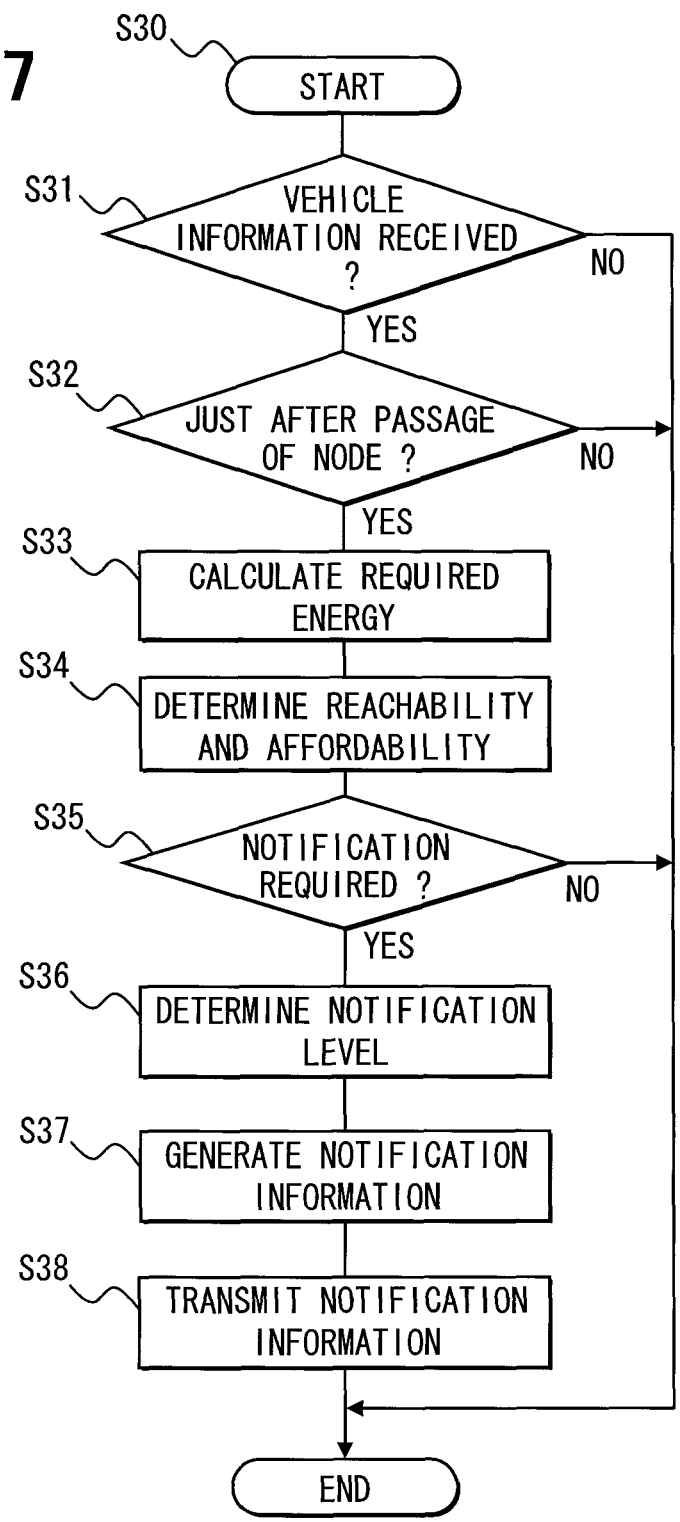
FIG. 7 is a flowchart of a determination process.

With reference to FIG. 7, along with the node information update process, the calculation unit 16 of the center device 10 performs a determination process for determining whether the vehicle that has transmitted the vehicle information can reach the charge point. The determination process is also performed repeatedly at predetermined intervals.

At S31, the calculation unit 16 determines whether the vehicle information has been received. If the vehicle information has not been received (S31:NO), the calculation unit 16 concludes the process of FIG. 7. If the vehicle information has been received (S31:YES), the calculation unit 16 proceeds to S32. The vehicle information is transmitted (i.e., uploaded) from the in-vehicle device 20 to the center device 10 at a cycle of every upload period as described with reference to FIG. 5. Therefore, S32 and subsequent steps are repeated at an interval of such upload period (i.e., upload timing).

At S32, the calculation unit 16 determines whether the vehicle has just passed through a node that has the node information. Such determination may be used to determine a situation in which a position of a vehicle is close to a node that has the node information. Therefore, based on a comparison between (i) the latest (i.e., the current) position of the vehicle included in the vehicle information received in S31 and (ii) the coordinates of the node (i.e., a node position) that has the node information, if a distance between the latest position of the vehicle and the node position is smaller than a certain threshold, the vehicle is determined to have just passed the node (i.e., a moment just after the passage of the vehicle through such node). Accordingly, when the vehicle has not passed the node (S32:NO), the calculation unit 16 concludes the process of FIG. 7. If the vehicle has just passed the node (S32:Yes), the calculation unit proceeds to S33.

The calculation unit 16, at S33, calculates the required energy. A calculation method of how the required energy is calculated is described with reference to FIG. 8.

In the present embodiment, the required energy is assumed to include four types of energy: (i) an energy consumed for a travel in a horizontal direction (i.e., an H-energy hereinafter), (ii) an energy consumed for a travel in a height direction (i.e., a Potential energy hereinafter), (iii) a speed-dependent energy, and (iv) a time-dependent energy. The total of the four types of energy equals to the required energy.

The H-energy (kWh) is assumed to include a rolling resistance loss (kWh) and a speed change loss (kWh). The rolling resistance loss is determined by equation 1, which is provided below.

The right side of equation 1 has a distance, a coefficient, and a vehicle weight m. The distance is taken from the travel distance of the node information (FIG. 2). The node information is provided for many nodes, however, the node information used for extracting the travel distance for equation 1 is taken is from the node information of the node that the vehicle has just passed through (i.e., a passed-thru node), as determined in S32 of FIG. 7. The coefficient of equation 1 is a pre-stored number. The vehicle weight m is determined based on the vehicle type provided in the vehicle information. Specifically, the calculation unit 16 refers to a specification sheet of a relevant vehicle type based on the vehicle type information in the vehicle information from among many specification sheets, and a vehicle weight is taken from such a sheet for the calculation of equation 1. Alternatively, the vehicle information may be configured to include a vehicle weight, and the vehicle weight may directly be taken from the vehicle information for the calculation of the equation 1.

$$\text{Rolling resistance loss} = \text{Distance} \times \text{Coefficient} \times \text{Vehicle weight } m \qquad \text{(Equation 1)}$$

The speed change loss is a loss by the change of the kinetic energy. The kinetic energy may be calculated by using equation 2.

$$\text{Kinetic energy} = (\tfrac{1}{2}) \times \text{Vehicle weight } m \times \text{Vehicle speed } V \times \text{Vehicle speed } V \qquad \text{(Equation 2)}$$

During travel, the vehicle repeats acceleration and deceleration. When the vehicle speed increases, the kinetic energy also increases. Such increase of energy must be provided from outside of the vehicle. However, as the vehicle speed decreases, so does the kinetic energy. Thus, the energy for the acceleration is lost in the deceleration. Therefore, the loss of kinetic energy is calculated by using equation 3 in the following. In this case, the term δV in equation 3 is a speed change in proportion to a position change. Further, though not shown in the equation 3, the summation (Σ) (i.e., addition) starts at the passed-thru node and ends at the charge point.

$$\text{Kinetic energy loss} = (\tfrac{1}{2}) \times \text{Vehicle weight } m \times \Sigma\{(V+\delta V) \times (V+\delta V) - V \times V\} \qquad \text{(Equation 3)}$$

Further, though a loss of the kinetic energy occurs at a time of deceleration, such a loss may be partially recovered/recouped as a regeneration energy. The total regeneration energy is a summation of the regeneration energy from each of regeneration sections, and the regeneration section is defined as a section in which the brake pedal is continuously pressed. The regeneration energy in each regeneration section is calculated by using equation 4. The regeneration section is "a braking section" that is included in the regeneration information. Efficiency of the regeneration is preset for each vehicle type. The regeneration efficiency is determined based on the vehicle type that is included in the vehicle information. A constant in equation 4 is set as an average value of the stepping forces, and may be taken from the regeneration information if the stepping force is included therein.

$$\text{Regeneration energy in regeneration section} = \text{Regeneration efficiency} \times \text{Constant(or, Stepping force)} \times \text{Vehicle weight } m \times \text{Acceleration of gravity } g \times \text{Time} \qquad \text{(Equation 4)}$$

The Potential energy is calculated by using equation 5. In equation 5, the vehicle weight m is determined based on the vehicle type, as described above. Further, the acceleration of gravity g is pre-stored. A height difference is a difference between an elevation of the passed-thru node and an elevation of the nearby charge point, and is determined from the map information.

$$\text{Potential energy} = \text{Vehicle weight } m \times \text{Acceleration of gravity } g \times \text{Height difference } h \qquad \text{(Equation 5)}$$

In case that there is no brake force data in Equation 4, Equation 3 and Equation 5 may be formulated in the following manner as Equation 3' and Equation 5'.

Acceleration: $\delta V > 0$ Kinetic energy loss=(½)×Vehicle weight $m \times \Sigma\{(V+\delta V) \times (V+\delta V) - V \times V\}$ (Equation 3')

Deceleration: $\delta V < 0$ Kinetic energy loss=(½)×Vehicle weight $m \times Kdw1 \times \Sigma\{(V+\delta V) \times (V+\delta V) - V \times V\}$ Kdw1:Speed decrease
(Regeneration coefficient for Kinetic energy loss)
(A part of speed decrease is used as the regeneration energy.)

Potential energy loss=Vehicle weight $m$×Acceleration of gravity $g$×($\Sigma$Height Up difference $hup$+$Kdw2$× $\Sigma$Height Down difference hdw) (Equation 5')

Height Up difference hup:Increase of elevation (Uphill hup>0)
Height Down difference hdw:Decrease of elevation (Downhill hdw<
Kdw2:Downhill (Regeneration coefficient for potential energy loss)

The speed-dependent energy is a loss by the air resistance. The air resistance loss is calculated as an integral value that is calculated as an integration of an air resistance F from the passed-thru node to the nearby charge point. The air resistance F is calculated by using equation 6. In equation 6, "ρ" is an air density, "C" is an air resistance coefficient, both of which are pre-stored. "S" is a vehicle's projected area, which is specified in the specification sheet, and is defined for each of the vehicle types. "V" is the vehicle speed, which is included in the vehicle information.

Air resistance $F=(\rho \times C \times S \times V \times V)/2$ (Equation 6)

The time-dependent energy is an amount of consumed electric power, or a wattage (Wh). Though various kinds of electric apparatuses are used in a vehicle, the electric power consumed by the air-conditioner is largest among all. Therefore, in the present embodiment, the amount of the electric power consumed by the air-conditioner is considered as a total amount of consumed electric power. Here, the amount of consumed electric power is calculated as a product of an electricity consumption (W) and a time, in which the time is assumed to be a total link travel time to the nearby charge point.

The calculation of the amount of the electric power consumed by the air-conditioner starts with a determination whether the air-conditioner is turned ON or OFF. The air-conditioner ON-OFF information is taken from the air-conditioner information in the vehicle information. When the air-conditioner is turned OFF, the electricity consumption is assumed to be 0. The electricity consumption of the air-conditioner is determined based on a difference between set temperature and outside temperature as well as an operation mode setting (i.e., the circulation mode or the intake mode). More practically, the electricity consumption is determined based on a relationship between the temperature difference and the electricity consumption of the air-conditioner. Such relationship is prepared for each of the vehicle types, and for both of the circulation mode and the intake mode of the air-conditioner operation.

The required energy is calculated as a total of the four types of energy, which include the H-energy, the Potential energy, the speed-dependent energy, and the time-dependent energy. Further, when the air-conditioner is turned ON, the required energy for the air-conditioner OFF time is also calculated at the same time. In the following, the former is designated as an ON-time required energy, and the latter is designated as an OFF-time required energy. In case that no distinction between these two energies is required, the energy is simply mentioned as the "required energy." The OFF-time energy is, in other words, a total of the H-energy, the Potential energy, and the speed-dependent energy.

Further, the required energy is calculated for each of the nearby charge points when multiple nearby charge points are included in the node information of the passed-thru node. However, with reference to the charge point information in FIG. 3, the nearby charge points corresponding to the regular holiday or outside of the business hours are excluded from such calculation. Further, if the battery deterioration information indicates that the battery is deteriorated, the required energy is calculated only for a travel to the nearby charge points having the maintenance facility.

Resuming the description of FIG. 7, after the calculation of the required energy at S33, the calculation unit 16, at S34, determines a reachability and an affordability of the vehicle. In other words, whether the electric vehicle can reach the nearby charge point, and to what degree the nearby charge point is easy to reach by the vehicle (i.e., affordability). In the reachability determination, the air-conditioner ON-time required energy and information regarding the remaining energy included in the vehicle information are compared with each other.

In particular, the minimum value of the ON-time required energy (i.e., lowest ON-time required energy) from among many values of the ON-time required energy to reach respective nearby charge points is compared to the remaining energy. When the remaining energy is greater than the lowest ON-time required energy by an amount (i.e., energy difference) equal to or greater than a first threshold TH1, such situation is determined as "Reachable" and the affordability is determined as "High."

Even when the remaining energy is greater than the lowest ON-time required energy (i.e., the minimum value from among many ON-time required energy values if many charge points exist), if the energy difference is less than or equal to a second threshold TH2, where the second threshold is less than the first threshold, such situation is determined to have a "Small" affordability. The second threshold TH2 may have an arbitrary value as long as the threshold TH2 can be considered as "small."

Further, when the remaining energy is greater than the lowest ON-time required energy, such that the energy difference is less than the first threshold TH1 but greater than the second threshold TH2, such situation is determined as "Reachable" and the affordability is determined as "Middle." In other words when the affordability is not "Large" nor "Small" it is determined to as "Middle", where the energy difference is defined as TH2<Energy difference<TH1.

When the remaining energy is smaller than the lowest ON-time required energy, the remaining energy is compared with the OFF-time required energy. When multiple nearby charge points exist, the comparison is performed with the OFF-time required energy of all of multiple charge points. If the OFF-time required energy of at least one of such charge points is greater than the remaining energy as a result of comparison, such situation is determined as "Reachable with air-cond. OFF," and the affordability is determined as "Extra-Small."

When the remaining energy is smaller than the OFF-time required energy to reach any one of the charge points, it is determined as "Not-Reachable." The above-described determinations are performed in S34, and the calculation unit 16 proceeds to S35, after S34.

The calculation unit 16 determines whether a notification regarding a low remaining energy should be provided at S35. Such determination is performed based on the affordability determination in S34 and the travel distance to the nearby charge point.

With reference to FIG. 9, the possible outcome of the determination performed in S35 is provided in a table. When the affordability is "Large," the notification necessity is determined as "Not-required." When the affordability is "Middle," the notification necessity may vary, depending on the reachability to a registered charge point.

The registered charge point is normally one of the nearby charge points included in the node information. In such case, the reachability of such registered charge point is already determined in S34. If the registered charge point is not one of the nearby charge points included in the node information, the reachability to such registered charge point may be determined separately. Alternatively, such registered charge point not included in the node information may be determined as "Not-Reachable," since such a registered charge point should be far from the current vehicle position.

If the affordability is "Middle," the notification is basically determined as required. However, even in such case, if a registered charge point is "Reachable," the notification may be "Not-required." If the affordability is "Small" or "Extra-Small," the notification is always "Required," even if a registered charge point is reachable.

The above description is about the notification necessity based on the levels of affordability. In addition to the affordability condition, the notification necessity is also determined based on the distance to the nearby charge point. For instance, when the affordability is "Middle," the distance condition to the nearby charge point is set to be within, for example, 2 km. Such distance may be arbitrarily set as a threshold distance indicating an area relatively close to the vehicle.

Further, when the affordability is "Small," the distance condition to the nearby charge point is set to be within 10 km. When the affordability is "Extra-Small" or "Not-Reachable," there is no condition specified as the distance condition to the nearby charge point. That is, the notification necessity is determined based only on the affordability.

Further, if the battery deterioration information of the vehicle information indicates that the battery is deteriorated, the notification necessity is always determined as "Required," without considering the affordability and the distance condition to the nearby charge point.

When the calculation unit 16 determines that the notification is not required (S35:NO), the process of FIG. 7 is concluded. When the notification is required (S35:YES), the calculation unit 16 determines a notification level at S36. The notification level is provided in FIG. 9. The notification is determined in association with the level of affordability. That is, as the affordability lowers, the notification level is raised. Further, the notification level is in a "Special level" when the battery deterioration information indicates that the battery is deteriorated.

Figures 10, 11:
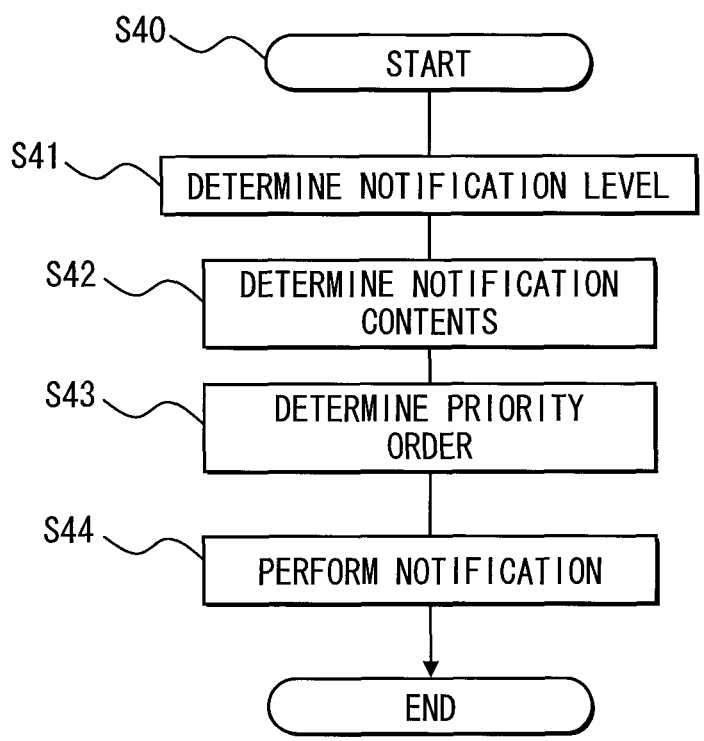
FIG. 10 is a diagram of notification information generated in the determination process of FIG. 7.
FIG. 11 is a flowchart of a notification process performed by the calculation unit of the in-vehicle device.

After S36, the calculation unit 16, at S37, generates notification information that is to be transmitted to the in-vehicle device 20. With reference to FIG. 10, the notification information includes (i) a notification level determined in S36 and (ii) the information about a reachable nearby charge point. The information of the reachable nearby charge point includes information identifying the charge point (e.g., a charge point P1) and information of the additional facility at the charge point (e.g., drugstore). The information of the reachable nearby charge point may also include information about the congestion at the charge point, and other information not shown in FIG. 10, such as a travel distance, a route, and a required time (i.e., a total link travel time) to the nearby charge point.

The calculation unit 16, at S38, transmits the notification information generated from the communication unit 12 of the center device 10 to the communication unit 22 of the in-vehicle device 20 disposed on the vehicle that is a target (i.e., an intended destination) of the notification information generated.

When the communication unit 22 of the in-vehicle device 20 receives the notification information, the calculation unit 26 of the in-vehicle device 20 performs a notification process (i.e., a determination result notification unit in claims) of FIG. 11.

The calculation unit 26 determines a notification level at S41, and then determines the content of the notification (i.e., notification content), at S42, based on the notification level. The notification content may be, for example, a message reflecting the notification content and a display color according to the notification level when the notification is depicted on a display unit (not shown). Further, the position of the reachable charge point, the congestion of such charge point, and the additional facility of such point may also be displayed. Further, the travel distance to the charge point, the route to the charge point, and the required travel time to the charge point may also be displayed.

At S43, the calculation unit 16 determines a priority order of multiple charge points when multiple reachable charge points are available. FIG. 12 illustrates a priority order. The priority order assigns a highest priority order (i.e., a priority order 1) to a charge point (i) that is on an expected travel route and (ii) that is positioned along a side of the road having the same traffic direction as the traveling direction of the vehicle (i.e., positioned along a side of a traffic direction along which the vehicle is traveling). The position of a charge point (i) that is on the expected travel route, but (ii) that is positioned along a side of the road having an opposite traffic direction as the travel direction of the vehicle has a second priority order (i.e., a priority order 2).

Further, if the vehicle is either traveling along a guidance route or having a guidance route setting, the expected travel route is such guidance route currently being used or set. However, the expected travel route may be estimated based on the travel locus of the vehicle. Further, based on the estimation of the travel route from the center device 10 according to the travel loci of many vehicles, the expected travel route of the vehicle may be included in the notification information and may be transmitted from the center device 10 to the vehicle.

When the charge point is not categorized as one of the two cases, while still located in the travel direction of the vehicle, the priority order of such charge point is ranked as a priority order 3. The travel direction of the vehicle may be, for example, a direction within a ±45 degree range with reference to a direction of the expected travel route described above, or with reference to a direction of the currently-traveling road (i.e., 0 degree). A situation of none of the above three cases is categorized as a priority order 4.

At S44, the calculation unit 26 provides the notification content that are determined at S42, in a prioritized manner according to the priority order determined at S43. The prioritized manner in this case means, for example, having a high order charge point closer to a top of the charge point list, which is displayed on the display unit.

Other forms of the "prioritized manner" may be, for example, restricting the number of charge points displayed on the display unit according to the priority order. That is, only a preset number of nearby charge points may be displayed on the list according to the priority order, and the preset number of the nearby charge points may be one.

According to the present embodiment, the present disclosure is summarized in the following manner:

The road map information includes the node information of a node that has a nearby charge point, and such node information is stored for the determination of the required energy required for the travel of a subject vehicle to reach such node (FIG. 2).

The required energy is then determined based on such node information and the vehicle information (S33) when the subject vehicle is determined to be close to such node having the node information (S32:YES).

Based on the comparison between the required energy and the remaining energy of the subject vehicle, the reachability of whether the subject vehicle can reach the nearby charge point is determined (S34).

Both of the node and the nearby charge point are a fixed point. Thus, the above calculation scheme reduces a calculation load, in comparison to a case in which an ever-changing travel route from a position of the subject vehicle to a nearby charge point is continuously calculated every time the position of the subject vehicle changes, for the purpose of calculating the required energy to travel such route to reach the nearby charge point.

Further, the node information is continuously updated by the center device based on the information obtained from each of the currently-traveling many electric vehicles (S20). Based on such continuously-updated node information, the required energy to the nearby charge point is accurately determined.

In a case where the affordability is "Large," (i.e., the remaining energy is greater than the required energy by an amount equal to or greater than the first threshold TH1), it is assumed that only a few drivers would charge the battery at such timing. Therefore, in the present embodiment, no notification is provided for the driver when the affordability is "Large." In such manner, a non-required notification for the driver is suppressed.

Further, when the affordability is "Middle" (i.e., TH2<energy difference<TH1), the remaining energy is decreasing to a certain extent, even though it is not considered as an emergency situation. Some drivers would consider charging the battery at such timing. However, even when charging at such timing, very few drivers would travel to a very far charge point because the degree of emergency at such point is still low. Therefore, in the present embodiment, the notification is provided only when a nearby charge point exists in proximity of the subject vehicle when the affordability is "Middle." That is, for example, only when the nearby charge point is within 2 km from the subject vehicle, such charge point is notified. In such manner, while suppressing an unnecessary notification, a necessary notification is effectively provided.

Further, when the affordability falls to "Small" (i.e., energy difference TH2), most drivers would consider charging even if the charge point is a bit far. Thus, in the present embodiment, when the affordability is "Small," the notification is provided according to a determination result. In such manner, a required notification will always be performed.

Further, in the present embodiment, the reachable nearby charge points are notified according to the priority order (FIG. 12). Therefore, according to such notification scheme using the priority order, easily-reachable charge points are notified in an easily-recognizable manner according to the priority order.

Second Embodiment

The second embodiment of the present disclosure is described in the following. The following description uses like numbers for like parts, and duplicate descriptions of the like parts is omitted for the brevity of the description.

In the second embodiment, the node information includes the required energy for travel to a nearby charge point for predetermined vehicle types.

The required energy is calculated based on the vehicle information and the node information (FIG. 8). The vehicle information is uniquely determined once the vehicle type is specified, except for a portion of the information regarding the time-dependent energy. Therefore, the air-conditioner OFF-time required energy is determined in advance according to each of the vehicle types.

Further, the outside temperature of many places may be obtained from various sources through communication, even when it is not available from the vehicle. Thus, once the outside temperature is determined, one or more user-preferred set temperature values may be determined.

Therefore, in the second embodiment, based on pre-calculation of the required energy on multiple conditions for a certain vehicle type, such pre-calculated required energy is stored as the node information. FIG. 13 is one example of the node information in the second embodiment. The node information in FIG. 13 is stored in addition to the node information illustrated in FIG. 2.

In the second embodiment, when the node information includes the pre-calculated required energy for a vehicle that has transmitted the vehicle information, the calculation at S33 of FIG. 7 for the determination of the required energy may be skipped. The calculation after such step is same as the first embodiment.

By pre-calculating the required energy for a predetermined vehicle type and by including such pre-calculated required energy in the node information, the calculation of the required energy for the same vehicle type is reduced, thereby further reducing the calculation load.

Third Embodiment

In the first embodiment, the in-vehicle device 20 uploads the vehicle information to the center device 10, and the center device 10 calculates the required energy. However, in the third embodiment, the determination process of FIG. 7 (i.e., a determination unit in claims) may also be performed by the calculation unit 26 of the in-vehicle device 20. Therefore, the notification necessity determination of S35 (a notification determination unit in claims), which is included in the determination process, may also be performed by the calculation unit 26 of the in-vehicle device 20. However, in such a case, the transmission of the notification information at S38 of FIG. 7 would be replaced with the notification process of FIG. 11.

Accordingly, the calculation unit 16 of the center device 10 may serve as an information transmission unit in claims, to transmit the node information to the in-vehicle device 20 from the communication unit 12, and the calculation unit 26 of the in-vehicle device 20 may serve as an energy determination unit in claims, to calculate the required energy based on the vehicle information and the node information.

Further, the transmission and the reception of the node information may be performed by the in-vehicle device 20 according to the node information request signal transmitted therefrom. The node information request signal maybe transmitted with the vehicle position information. The center device 10 then determines the node information to be transmitted to the in-vehicle device 20, from among many entries of the node information of respective nodes, based on the vehicle position information.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A charge point reachability determination system comprising:
   a center device including:
      a communication unit communicating with an electric vehicle,
      a memory unit storing road map information representing a road by using a link and a node, including node information of the node having a nearby charge point, wherein the node information is used for determining a required energy of the electric vehicle for reaching the nearby charge point from the node when the node has at least one nearby charge point,
      an energy determination unit determining the required energy, and
      a determination unit determining whether the nearby charge point is reachable by the electric vehicle; and
   an in-vehicle device disposed in the electric vehicle and including:
      a communication unit communicating with the communication unit of the center device,
      an in-vehicle obtainment determination unit obtaining vehicle information regarding the electric vehicle, and
      an information transmission unit transmitting the vehicle information to the center device via the communication unit, wherein
   the energy determination unit determines the required energy based on the node information and the vehicle information of the electric vehicle when the electric vehicle is positioned in proximity to the node that has the node information, and
   the determination unit determines whether the electric vehicle is able to reach the nearby charge point based on a comparison between the required energy determined by the energy determination unit and a remaining energy of the electric vehicle, which is an amount of energy that is available for driving the electric vehicle.

2. The charge point reachability determination system of claim 1, wherein,
   the vehicle information includes air-conditioner information that determines an electric power consumption by an in-vehicle temperature adjustment device,
   the energy determination unit determines two required energies for the travel of the electric vehicle, one for an ON-status of the in-vehicle temperature adjustment device and an other for an OFF-status of the in-vehicle temperature adjustment device, and
   the determination unit determines whether the electric vehicle is able to reach the nearby charge point based on a comparison between the remaining energy with each of the two required energies.

3. The charge point reachability determination system of claim 1, wherein
   the node information includes a calculated required energy for multiple preset vehicle types,
   the vehicle information includes information of a vehicle type of the electric vehicle, and
   the energy determination unit determines the required energy by referring to an associated calculated required energy for the vehicle type of the electric vehicle provided in the vehicle information from among the calculated required energy for the preset vehicle types provided in the node information.

4. The charge point reachability determination system of claim 1, wherein the energy determination unit does not determine the required energy for the nearby charge point when the nearby charge point is closed based on its hours of operation.

5. The charge point reachability determination system of claim 1, wherein
   the vehicle information includes battery deterioration information that indicates a deterioration condition of a battery that is used for driving the electric vehicle, and
   the energy determination unit determines the required energy only for the nearby charge point having a battery maintenance facility when the battery deterioration information indicates a deteriorated condition of the battery.

6. A charge point reachability determination system comprising:
   a center device including,
      a communication unit communicating with an electric vehicle,
      a memory unit storing road map information representing a road by using a link and a node, including node information of the node having a nearby charge point, wherein the node information is used for determining a required energy of the electric vehicle for reaching the nearby charge point from the node when the node has at least one nearby charge point, and
      an information transmission unit transmitting the node information to the electric vehicle via the communication unit; and
   an in-vehicle device disposed in the electric vehicle and including:
      a communication unit communicating with the communication unit of the center device,
      an in-vehicle obtainment determination unit obtaining vehicle information regarding the electric vehicle,
      an energy determination unit determining the required energy based on the node information received from the center device and the vehicle information of the electric vehicle when the electric vehicle is positioned in proximity to the node that has the node information, and
      a determination unit determining whether the nearby charge point is reachable by the electric vehicle based on a comparison between the required energy determined by the energy determination unit and a remaining energy of the electric vehicle, the remaining energy being an amount of energy available for driving the electric vehicle.

7. The charge point reachability determination system of claim 6, wherein,
   the vehicle information includes air-conditioner information that determines an electric power consumption by an in-vehicle temperature adjustment device,
   the energy determination unit determines two required energies for the travel of the electric vehicle, one for an ON-status of the in-vehicle temperature adjustment device and an other for an OFF-status of the in-vehicle temperature adjustment device, and the determination unit determines whether the electric vehicle is able to reach the nearby charge point based on a comparison between the remaining energy with each of the two required energies.

8. The charge point reachability determination system of claim 6, wherein the node information includes a calculated required energy for multiple preset vehicle types, the vehicle information includes information of a vehicle type of the electric vehicle, and the energy determination unit determines the required energy by referring to an associated calculated required energy for the vehicle type of the electric vehicle provided in the vehicle information from among the calculated required energy for the preset vehicle types provided in the node information.

9. The charge point reachability determination system of claim 6, wherein the energy determination unit does not determine the required energy for the nearby charge point when the nearby charge point is closed based on its hours of operation.

10. The charge point reachability determination system of claim 6, wherein the vehicle information includes battery deterioration information that indicates a deterioration condition of a battery that is used for driving the electric vehicle, and the energy determination unit determines the required energy only for the nearby charge point having a battery maintenance facility when the battery deterioration information indicates a deteriorated condition of the battery.

\* \* \* \* \*